No. 861,635. PATENTED JULY 30, 1907.
J. J. BURNS.
DINNER BUCKET.
APPLICATION FILED SEPT. 1, 1906.
2 SHEETS—SHEET 1.
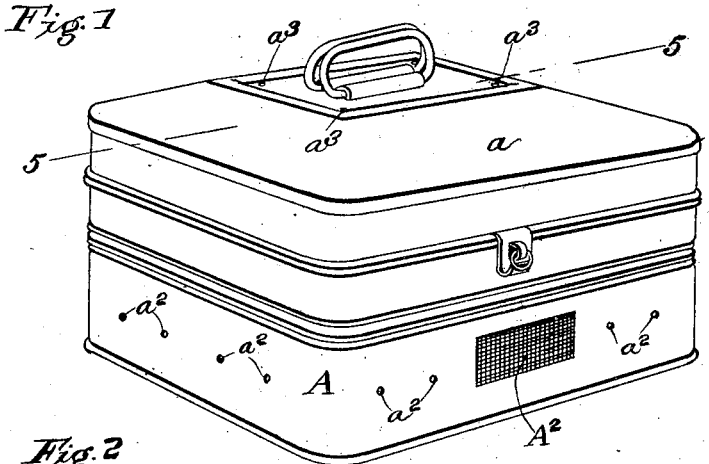
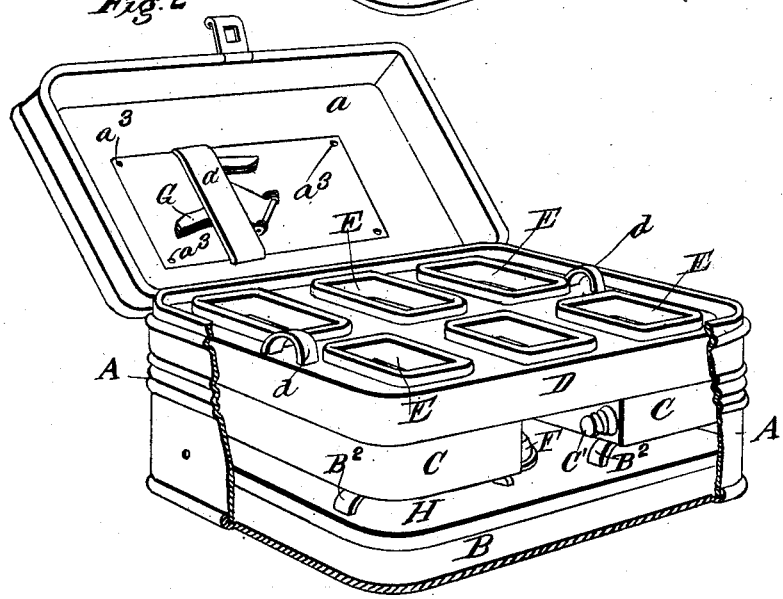
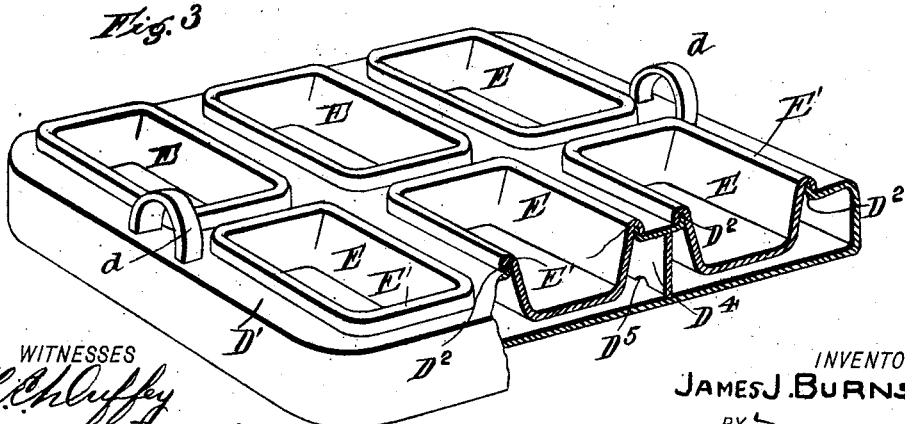
WITNESSES
E. C. Duffy
Perry B. Turpin
INVENTOR
James J. Burns
BY Munn & Co.
ATTORNEYS No. 861,635. PATENTED JULY 30, 1907.
J. J. BURNS.
DINNER BUCKET.
APPLICATION FILED SEPT. 1, 1906.
2 SHEETS—SHEET 2.
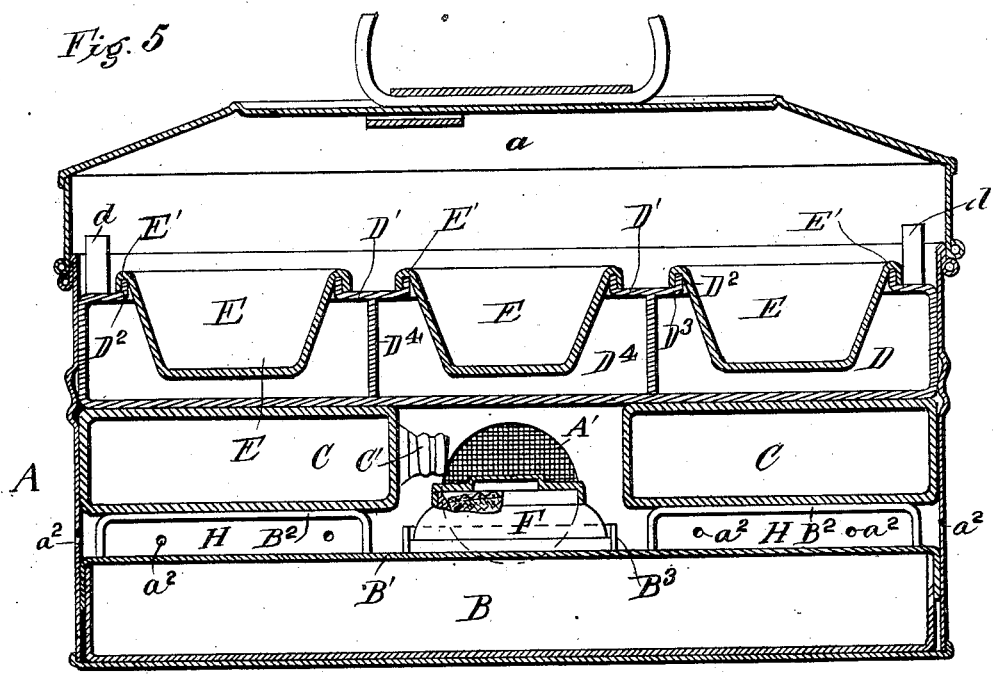
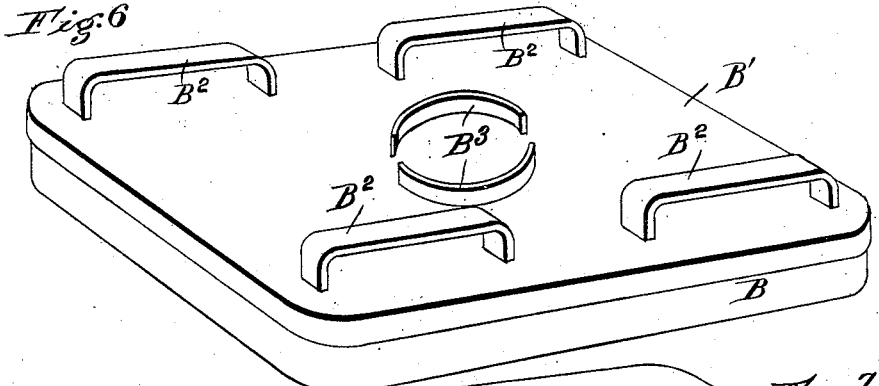
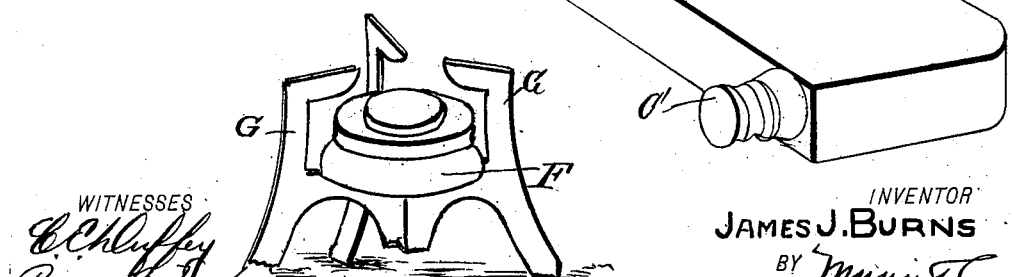
WITNESSES
INVENTOR
JAMES J. BURNS
BY
ATTORNEYS

UNITED STATES PATENT OFFICE.

JAMES J. BURNS, OF CUMBERLAND, MARYLAND.

DINNER-BUCKET.

No. 861,635.  Specification of Letters Patent.  Patented July 30, 1907.

Application filed September 1, 1906. Serial No. 332,911.

*To all whom it may concern:*

Be it known that I, JAMES J. BURNS, a citizen of the United States, and a resident of Cumberland, in the county of Allegany and State of Maryland, have invented certain new and useful Improvements in Dinner-Buckets, of which the following is a specification.

My invention is an improvement in dinner buckets intended especially for working men and others who may desire to take dinner with them, and for heating the different articles, and the invention consists in certain novel constructions and combinations of parts as will be hereinafter described and claimed.

In the drawing Figure 1 is a perspective view of my dinner bucket with the lid closed. Fig. 2 is a similar view with the lid open and parts of the body or bucket broken away in section to illustrate the devices contained within the bucket. Fig. 3 is a detail perspective view partly broken away in section of the boiler with the dishes therein. Fig. 4 is a detail sectional view illustrating the construction of one of the dishes. Fig. 5 is a vertical longitudinal section of the bucket on about line 5—5 of Fig. 1. Fig. 6 is a detail perspective view of the base pan. Fig. 7 is a detail perspective view of one of the liquid containers, and Fig. 8 is a detail perspective view of the lamp and the folding stand therefor.

In carrying out my invention I employ a bucket or body A, a base pan B, liquid containers C, a boiler D and dishes E fitted thereto, the whole being adapted to be heated by a lamp F which may be applied as shown in Fig. 5. In practice I prefer to make the bucket or body and the parts contained therein, except the base box B and its lid and the lamp F, of enameled ware, usually white, as will be understood from Fig. 4 of the drawing. The bucket or body A and the bread box and its lid may if desired be made of suitable tin or other sheet metal as may be desired.

The base box B may be utilized to hold bread or the like and is provided with a removable lid B' upon which at its ends I mount the stands B² which project upwardly and form supports for the liquid containers C as shown in Figs. 2 and 5 of the drawing. These upwardly projecting stands B² are spaced apart and afford an intermediate space for the lamp F, and in these spaces at the center of the lid B' I prefer to provide the upwardly projecting curved plates B³ forming a lamp holder and within which the lamp F is fitted, as shown in Figs. 2 and 5. The stands B² are shown as bails secured at their ends to the lid and may also be utilized as handles for the lid. The body A may be perforated at $a^2$ opposite the space above the base pan B and suitable screened openings A' and A² may be provided at the rear and front side of the body to afford ventilation as may be desired.

The liquid containers C rest upon the stands B² on opposite sides of the lamp and are provided with discharge openings and with closures C' therefor, as will be understood from Figs. 2, 5 and 7 of the drawing. These liquid containers form a support for the boiler D which rests at its ends upon said containers and extends over the lamp space so it will be heated by the lamp as will be understood from Figs. 2 and 5. This boiler D has its top D' provided with suitable openings D² surrounded by the upwardly projecting flanges D³ and the dishes E fit within said openings, project downwardly within the boiler D, and are provided with rim flanges E' which overlie the flanges D³ of the boiler and form close joints therewith, as shown in Figs. 3 and 5 of the drawings. I prefer to subdivide the boiler by means of partitions D⁴ having at their lower ends openings D⁵ communicating with the different sections of the boiler, this being useful in preventing all the water in the boiler from passing too rapidly to one end thereof, when the bucket is tilted slightly in carrying the same.

The boiler D is provided at its ends with handles $d$ by which it may be carried or moved from place to place.

The bucket lid $a$ is hinged at one edge, provided with suitable fastenings at its other edge, is vented at $a^3$ and has on its under side a loop $a'$ in which the folding lamp stand G as shown in Figs. 2 and 8 may be placed when the stand is folded. This stand may be useful in holding the lamp for heating any desired article and can be conveniently carried when not in use, as shown in Fig. 2.

By the construction of the pan with the stands B² and the liquid containers mounted thereon, the liquid containers form a support for the boiler and also constitute the upper walls of the draft space H between said containers and the top of the bucket, as best shown in Figs. 2 and 5.

The pan B may be utilized to contain bread and the like, soup, hot coffee or other articles may be placed within the containers C, while the dishes E may be utilized to receive meats and vegetables, pudding or other articles, as may be desired.

The improved dinner bucket will be found useful by hotels and restaurants for sending out hot dinners, as well as for use by working men, as before explained.

I claim:

1. A dinner bucket substantially as herein described comprising a body, a base box in the said body, a lid for said box provided at its center with a lamp holder and at its ends with upwardly projecting stands forming supports for liquid containers or cans, cans supported on said stands and having suitable discharge openings and closures therefor, a boiler fitting in the body and supported at its ends on the liquid containers and extending over the lamp holder and provided with a top plate or cover, and with openings therein, dishes fitting in said openings, partitions within the boiler and having openings through which water may circulate, and a lamp substantially as and for the purpose set forth.

2. The combination of the body, a box fitting therein and having its lid provided with upwardly projecting stands spaced apart to afford an intermediate space for a heater, liquid containers on said stands on opposite sides of the heater space, a heater and a boiler mounted on the liquid containers and extending over the heater, substantially as set forth.

3. The combination in a dinner bucket with the body and liquid containers or cans, of stands spaced apart affording an intermediate heater space and supporting the said liquid containers on opposite sides thereof and affording a draft space below the said containers and a heater, substantially as set forth.

4. The combination with the bucket or body and stands therein forming elevated supports for liquid containers, of liquid containers on said supports and spaced apart forming a heater space, a boiler mounted on said containers and extending over the heater space and a heater, substantially as set forth.

5. In a dinner bucket the combination with the body and the boiler therein and having openings, of dishes fitted therein and also provided with partitions subdividing the boiler space and having openings for the restricted circulation of water in the boiler, and supports for the said boiler whereby it may be secured above the heater space and a heater, substantially as set forth.

6. The combination of the bucket or body, the base box therein and having a lid provided with a central lamp holder and on opposite sides thereof with upright stands, cans mounted on said stands and spaced apart, the boiler above the cans and extending over the space between the same and a heater, substantially as set forth.

7. A dinner bucket comprising a body, a boiler therein having openings and dishes fitting therein, supports in the body for the said boiler and spaced apart forming a heater space, and a heater, substantially as set forth.

8. The combination of the body, the base box fitting therein and having a lid provided at its ends with upright stands, cans mounted on the said stands and forming with the box lid a draft space, the body being vented opposite the said draft space and a heater, substantially as set forth.

JAMES J. BURNS.

Witnesses:
C. H. BRANDLER,
W. J. McCARTY.